US012579240B2

(12) United States Patent
Anwar et al.

(10) Patent No.: US 12,579,240 B2
(45) Date of Patent: Mar. 17, 2026

(54) METHOD FOR ELECTRONIC IDENTITY VERIFICATION AND MANAGEMENT

(71) Applicant: Data Zoo Pty Limited, North Sydney (AU)

(72) Inventors: Memoona Anwar, North Sydney (AU); Antony Fitzgibbon, North Sydney (AU)

(73) Assignee: Data Zoo Pty Limited, North Sydney (AU)

( * ) Notice: Subject to any disclaimer, the term of this patent is extended or adjusted under 35 U.S.C. 154(b) by 243 days.

(21) Appl. No.: 18/190,732

(22) Filed: Mar. 27, 2023

(65) Prior Publication Data

US 2023/0259602 A1 Aug. 17, 2023

Related U.S. Application Data

(63) Continuation-in-part of application No. PCT/AU2022/051052, filed on Aug. 25, 2022.

(30) Foreign Application Priority Data

Aug. 25, 2021 (AU) ................................. 2021902782
Mar. 9, 2023 (AU) ................................. 2023201493

(51) Int. Cl.
*H04L 29/00* (2006.01)
*G06F 21/32* (2013.01)
(Continued)

(52) U.S. Cl.
CPC .......... *G06F 21/32* (2013.01); *G06F 21/6245* (2013.01); *G06V 40/172* (2022.01); *G06V 40/40* (2022.01)

(58) Field of Classification Search
CPC ... G06F 21/32; G06F 21/6245; G06V 40/172; G06V 40/40; G06Q 20/3274;
(Continued)

(56) References Cited

U.S. PATENT DOCUMENTS

2006/0089894 A1* 4/2006 Balk ...................... G06Q 40/03
705/35
2007/0093234 A1* 4/2007 Willis ................. G06F 21/6245
455/410
(Continued)

OTHER PUBLICATIONS

International Preliminary Report on Patentability mailed Feb. 27, 2024, for priority International Patent Application No. PCT/AU2022/051052.
(Continued)

*Primary Examiner* — Ghazal B Shehni
(74) *Attorney, Agent, or Firm* — Renner, Otto, Boisselle & Sklar, LLP

(57) ABSTRACT

A method for electronic identity verification and management includes receiving a request for verification of identity for a customer from a service provider; requesting consent from the customer to access data from one or more data holders associated with the customer; receiving consent from the customer to access data from the one or more data holders and sending the consent to the one or more data holders; receiving customer data from the one or more data holders; processing the customer data to verify the identity of the customer, identifying one or more online identity sources of the customer and analysing the one or more online identity sources to determine a level of risk associated with the customer identity, and generating a verified compound digital identity for the customer based on the authenticated identity document and the one or more online identity sources of the customer without storing personally identifiable information.

20 Claims, 4 Drawing Sheets

(51) Int. Cl.
    *G06F 21/62*         (2013.01)
    *G06V 40/16*        (2022.01)
    *G06V 40/40*        (2022.01)

(58) Field of Classification Search
    CPC ......... G06Q 20/40145; G06Q 2220/00; G06Q
             20/20; H04L 9/3231; H04L 63/0861;
             H04L 63/105; H04L 67/02; H04W 12/06
    See application file for complete search history.

(56) References Cited

U.S. PATENT DOCUMENTS

| | | | | |
|---|---|---|---|---|
| 2008/0091600 | A1* | 4/2008 | Egnatios | G06Q 40/03 |
| | | | | 705/42 |
| 2016/0191518 | A1* | 6/2016 | Bud | H04L 9/08 |
| | | | | 726/7 |
| 2016/0232534 | A1 | 8/2016 | Lacey et al. | |
| 2018/0165781 | A1* | 6/2018 | Rodriguez | H04L 63/08 |
| 2018/0367310 | A1* | 12/2018 | Leong | H04L 63/102 |
| 2019/0149334 | A1* | 5/2019 | Van Der Velden | H04L 9/0877 |
| | | | | 713/185 |
| 2020/0042685 | A1 | 2/2020 | Tussy et al. | |

OTHER PUBLICATIONS

Australian Examination Report issued in corresponding Australian Application No. 2023201493 mailed Apr. 3, 2024.
International Search Report mailed Dec. 2, 2022, for priority International Patent Application No. PCT/AU2022/051052.
Written Opinion mailed Dec. 2, 2022, for priority International Patent Application No. PCT/AU2022/051052.
International-type search report dated Jul. 12, 2022, for priority Australian Patent Application No. 2021902782.

* cited by examiner

METHOD FOR ELECTRONIC IDENTITY VERIFICATION AND MANAGEMENT

RELATED APPLICATIONS

This application is a continuation-in-part of and claims priority of International Patent Application No. PCT/AU2022/051052, filed Aug. 25, 2022, which claims priority of Australian Patent Application No. 2021902782, filed Aug. 25, 2021, each of which is hereby incorporated herein by reference in its entirety. This application further claims priority of Australian Patent Application No. 2023201493, filed Mar. 9, 2023, which is a divisional of Australian Patent Application No. 2021902782, filed Aug. 25, 2021, each of which also is hereby incorporated herein by reference in its entirety.

TECHNICAL FIELD

The present invention relates to a method for identifying and verifying a customer. In particular, the method relates to a method for secure electronic identity verification and management wherein personally identifiable information is not stored.

BACKGROUND

To avoid the risk of fraudulent identity presentation, many businesses check documents for authenticity by visually inspecting the identity document and comparing the face of the person present with the image on the identity document. While this method may well determine that the person claiming the identity is present, it offers no assurance that the identity document has not been falsified or stolen or even revoked by the issuing authority. While some businesses will undertake such an external check, this is often a time-consuming process and may not be possible if the transaction is conducted outside of the operating hours of the issuing authority.

However, physically comparing the face of a person with the image on the identity document is generally not possible for online transactions where the person is not physically present. In this instance, to avoid the risk of fraudulent identity presentation online, businesses rely on checking user-entered personally identifiable information (PII) such as passport information, social security number, date of birth, place of birth, or the like, with stored information. While this method may offer evidence that a real-world identity exists, it offers no assurance that the person who can legitimately claim the identity is genuinely present in the online interaction.

Storing personally identifiable information may also be problematic from a security perspective. Customers are required to provide personally identifiable information for every service they use, and even for every transaction, which increases the number of recipients with access to potentially sensitive information which can identify the person uniquely. Concerningly, stored personally identifiable information may be at risk of being exposed through data breaches, stolen during cyberattacks, or used by the recipient without consent of or transparency to the owner of the information.

Further, methods that rely on checking user-entered personally identifiable information against stored information may also be problematic from a legal compliance perspective. Businesses storing personally identifiable information are subject to strict local and international regulations and laws and businesses may find it difficult to keep pace with the changing regulatory landscape with new laws and obligations being introduced every day.

In addition to the disadvantages listed above, existing methods are inconvenient to both the customer and the business if personally identifiable information must be provided for every service, or for every transaction. Not only is this inconvenient for the customer, but it can be time-consuming or lead to delays in the transaction. In addition, the personally identifiable information may become out of date requiring the customer to remember which businesses need to be informed of the change.

As such, there is clearly a need for improved methods for electronic identity verification and management and methods for using an electronic identity verification and management system without sharing personally identifiable information.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a method for identifying and verifying a customer and a method for using an electronic identity verification and management system wherein personally identifiable information is not stored, which may at least partially address one or more of the problems or deficiencies mentioned above or which may provide the public with a useful or commercial choice.

With the foregoing in view, the present invention in one form, resides broadly in a method for identifying and verifying a customer, the method comprising:

receiving a request for a verification of identity for a customer;

capturing, using an electronic device associated with an electronic identity verification and management platform, a biometric characteristic of the customer and comparing the biometric characteristic with an identity document associated with the customer to verify a presence of the customer;

authenticating the identity document associated with the customer;

identifying one or more online identity sources of the customer and analysing the one or more online identity sources to determine a level of risk associated with the identity of the customer;

generating a verified compound digital identity for the customer based on the identity document associated with the customer and the one or more online identity sources without storing personally identifiable information, and associating the verified compound digital identity of the customer with an electronic device of the customer.

Advantageously, the method ensures secure verification of a digital identity without requiring central storage of personally identifiable information. This ensures the digital identity being verified is legitimate for the transaction and ensures the customer has visibility and control over their personally identifiable information and how it is collected and stored. In addition, the method uses a compound digital identity with multiple matching sources of government issued identity documents and online identity sources to help ensure that potential customers are probably legitimate. Advantageously, the method provides flexibility for a service provider to create a flexible verification workflow based on whether more or less stringent authentication and verification steps are required.

As indicated, the method for identifying and verifying a customer comprises receiving a request for a verification of identity for a customer.

The verification of identity for a customer may be requested for any suitable purpose. Generally, the verification of identity may be requested to verify a presence of a customer and an identity of the customer.

As used herein, the term "customer" is an individual seeking to have their identity verified or an individual who is having their identity verified at the request of a service provider or an authorised representative of the service provider. The customer may seek to have their identity verified for any suitable purpose. For example, a customer may require their identity be verified in order to access banking and financial services or data, assess risk for insurance or credit, conduct e-commerce transactions, obtain information or determine visa entitlement to work or study, for work-related background checks, for working with children background checks, conduct Know Your Customer (KYC) checks, undertake anti-money laundering and counter-terrorism screening, verify legal age, rental tenancy checks, or the like.

Preferably, a service provider intended to receive the request for a verification of identity for the customer determines a verification workflow for the method for identifying and verifying the customer suitable for the intended purpose.

In this instance, it will be understood that the term "verification workflow" is intended to refer to the specific details of how each of the steps of the method are performed, wherein the steps of the method generally comprise capturing the identity of the customer, verifying the identity of the customer and generating a verified compound digital identity for the customer.

Generally, the verification workflow may vary depending on the purpose for which the verified compound digital identity is being requested. In this instance, it will be understood that a compound digital identity comprises information from multiple identity sources including government-issued identity documents as well as professional, business, information, and social identities of the customer.

For example, a service provider requiring a verification of identity for a customer requesting a bank loan or requiring the transfer of funds overseas may create a verification workflow that requires the customer to prove their presence by live capture of a facial image of the customer which is then compared to a verified biometric characteristic associated with at least one of the identity documents provided by the customer. The customer may be asked to provide specific types and numbers of identity documents for authentication against local and global government data sources and subjected to stringent background checks including checking sanction lists. The service provider may also check any online identity sources of the customer for undisclosed legal proceedings or loan defaults as well as any online behaviours or reputation which might indicate the customer may use the money fraudulently.

For example, a service provider requiring a verification of identity for a customer to check the customer is over the legal age may create a verification workflow which requires the authentication of an identity document provided by the customer, requires the customer to provide a valid phone number and requires that any online identity sources are checked to provide date-of-birth verification.

The request for a verification of identity may be received in any suitable manner. Generally, the request for the verification of identity may be delivered to a customer by a secure digital channel to an electronic identity verification and management platform.

For example, the electronic identity verification and management platform may receive the request for a verification of identity through a user interface on an electronic device of the customer, an application downloaded onto an electronic device of the customer, through a secure website or web portal associated with the electronic identity verification and management platform, or the like.

In some embodiments, the customer may provide a valid phone number and consent in connection with requesting a verification of identity. In this instance, it is envisaged that a service provider may provide the customer with a one-time password to allow the customer to provide an identity document or other personal information to the electronic identity verification and management platform by a secure digital channel.

The electronic identity verification and management platform may be of any suitable type. Generally, the electronic identity verification and management platform may enable a customer to gain access to the platform through an internet connection whereby the customer remotely accesses the electronic identity verification and management platform.

For example, the electronic identity verification and management platform may comprise a user interface produced and displayed on an electronic device of the customer, an application downloaded onto an electronic device of the customer, through a program connected via an Application Programming Interface (API) to the electronic identity verification and management platform, through a secure website or web portal associated with the electronic identity verification and management platform, or the like.

In some embodiments, an identity provider may facilitate the verification of an identity of the customer for a service provider.

For example, the identity provider may support the electronic identity verification and management platform, may manage a cloud server and/or an API associated with the operation of the electronic identity verification and management platform, may facilitate the authentication of an identity document with a document issuing authority, may generate a verified compound digital identity for the customer, may issue and attest to a verifiable claim, and any suitable combination thereof.

As indicated, the method for identifying and verifying a customer comprises capturing, using an electronic device associated with the electronic identity verification and management platform, a biometric characteristic of the customer and comparing the biometric characteristic with an identity document associated with the customer to verify a presence of the customer.

The presence of the customer may be verified in any suitable manner. Generally, the method must be sufficient to verify that the customer claiming an identity is a real person and is not an artificial construct, a robot, an avatar, a mask, or the like, and verify that the rightful claimant of the identity is genuinely present in the transaction and is not another person, an identity thief, or the like.

Any suitable biometric characteristic of the customer may be captured.

For example, the biometric characteristic may be a fingerprint, thumbprint, facial image, facial geometry, retinal scan, iris scan, voice print, speech pattern, genetic signature, or the like.

In some embodiments, the presence of the customer is verified using one or more of liveness detection, facial recognition technology, fingerprint, iris detection and voice authentication.

In some embodiments, the biometric characteristic comprises a facial image of the customer. The facial image may be captured using any suitable electronic device, such as a camera, a 3D camera, a video camera, or the like.

In some embodiments, the biometric characteristic may be captured continuously. For example, the biometric characteristic may be captured using a video camera or other suitable continuous image capture measurement.

In some embodiments, verifying the identity of the customer comprises utilising facial recognition technology to compare a biometric characteristic captured of the customer with an identity document associated with the customer.

In other embodiments, verifying the identity of the customer comprises utilising voice authentication technology to compare a biometric characteristic captured of the customer with a voiceprint associated with the customer.

In some embodiments, authenticating the identity document associated with the customer is performed upon verifying the presence of the customer. Such configuration may provide efficiencies in that it may avoid authentication of identity documents when the presence of the customer cannot be appropriately verified.

Any suitable identity document may be used. Generally, the identity document may be an identity document issued by an official or government organisation. The identity document may be issued by an official or government organisation in any geographical location and may be in any language.

For example, the identity document may be a passport, biometric or e-passport, driver's license, digital license, visa, residence permit, identity card, or the like. For example, the identity document may be a healthcare card, a social security card, or the like. For example, the identity document may be a birth certificate, a certificate of adoption, a marriage certificate, an academic qualification, or the like.

In some embodiments, the identity document and/or the verified biometric characteristic of the customer may be stored electronically on an electronic device associated with the customer, such as in a digital wallet of a mobile device, or an application on the mobile device.

The biometric characteristic of the customer may be compared with any suitable information on the identity document. In this instance, it will be understood that the biometric characteristic of the customer is compared to a verified biometric characteristic associated with the customer identity document. For instance, the biometric characteristic may be compared with printed text information about the customer, an image of the customer, a barcode, a Quick Response or QR code, a Radio-Frequency Identification or RFID chip, an integrated circuit, or the like.

In some embodiments, the biometric characteristic may be compared with the customer's image on the identity document.

In some embodiments, the biometric characteristic may be compared to data read from a chip on the identity document. For instance, the biometric characteristic may be compared to data read from a Radio Frequency Identification (RFID) chip on the identity document. Preferably, the biometric characteristic may be compared to data read from a chip on the identity document through Near Field Communication (NFC).

In some embodiments, the biometric characteristic of the customer and an image of the identity document associated with the customer may be captured substantially simultaneously. In this instance, it is envisaged that the method may verify that the person depicted in the identity document is the same person who has the identity document in their possession.

In some embodiments, the biometric characteristic of the customer may be a facial image of the customer and wherein the facial image of the customer and the image of the identity document associated with the customer may be captured using high-definition video. Preferably, the facial image of the customer and the image of the identity document associated with the customer may be captured using high-definition video in real-time. In this instance, it is envisaged that the method may be used to verify the presence of the customer in real-time.

In some embodiments, verifying the presence of the customer comprises using liveness detection. Liveness detection may be undertaken using any suitable method. Generally, liveness detection may be sufficient to guarantee that the customer is a real, live individual, not an artificial construct.

Use of liveness detection, comparison of biometric characteristics and continuous capture of images may assist in detection of fraudulent identity presentation including use of the same face across multiple identity presentations.

An outcome of the verification of identity for a customer may include, the customer requesting the verification is or is not present, the customer requesting the verification is or is not the person depicted in the identity document, or the identity of the customer is unable to be verified, or any suitable combination thereof.

As indicated, the method for identifying and verifying a customer comprises authenticating the identity document associated with the customer.

The identity document may be authenticated in any suitable manner. Generally, the authentication method must be sufficient to verify that the identity document is legitimate and provides evidence that a real-world identity exists.

For example, the identity document may be authenticated by checking the identity document against the document issuing authority, against other local, federal or international government data sources, by checking the document has not been tampered with (such as by checking the format of the identity document type against a library of templates, by checking text or other areas of the identity document have not been tampered with, or the like) by checking the document has not been used fraudulently (such as by checking sanction lists, registers of known fraudulent identities such as those provided by law enforcement agencies, or the like), or the like.

In use, it is envisaged that the authentication of identity documents may be conducted across any suitable jurisdiction, including interstate, federal and international jurisdictions, within the legal and trust frameworks established by those jurisdictions. For example, identity documents such as visas or other government-issued identity document issued by one country may be authenticated to verify the identity of a customer visiting or residing in a different country, identity documents such as a driver's license or car registration document issued by one state may be authenticated to verify the identity of a customer visiting or residing in a different state, or the like.

An outcome of authenticating the identity document may include that the identity document is, or is not, authentic, or is unable to be authenticated.

In some embodiments, one or more further identity documents may be requested if the digital identity of the customer cannot be verified based on the information initially provided when the verification of identity for the customer was requested. For instance, one or more further identity documents may be requested if the reputation in the identity elements provided by the customer may not be sufficient to provide a level of confidence or assurance in the verified compound digital identity and/or indicate a level of risk of the verified compound digital identity.

In some embodiments, one or more further identity documents may be requested from the customer if the presence of the customer cannot be verified. For instance, one or more further identity documents may be requested if the verified biometric characteristic associated with the identity document does not match the biometric characteristic of the customer captured by the electronic identity verification and management platform.

In some embodiments, the identity document may be compared against a pre-verified record of the customer associated with the electronic identity verification and management platform.

As indicated, the method for identifying and verifying a customer comprises identifying one or more online identity sources of the customer and analysing the one or more online identity sources to determine a level of risk associated with the customer.

In some embodiments, the online identity source may comprise a business identity (such as an individual, a company owner, business name, or the like), an information identity, a professional identity (such as job title, or the like), a social identity (such as Facebook, LinkedIn, Twitter, Snapchat, or the like), or the like. In other embodiments, the online identity source may comprise an identity on the dark web, a global watch list, or the like.

In use, it is envisaged that the one or more online identity sources of the customer may be analysed to identify identity elements which may be used to determine a level of risk associated with the identity of the customer.

For instance, information obtained from a social identity of the customer such as comments made on social media posts may be a social identity element which suggests the customer may have an undisclosed criminal record or other legal proceeding, may be associated with an organisation on a watch list, or the like. In this instance, the behaviour or reputation of the customer may indicate a level of risk associated with either the identity document or the customer.

For instance, information obtained from the customer's online connectivity or mobile device may indicate the customer has poor security and may be at risk of being hacked. In this instance, the connectivity and device of the customer may indicate a level of risk associated with either the identity document or the customer.

For instance, information obtained from a business identity of the customer may indicate the customer may have undisclosed legal proceedings or loan defaults.

As indicated, the method for identifying and verifying a customer comprises generating a verified compound digital identity for the customer based on the identity document associated with the customer and the one or more online identity sources.

In some embodiments, the verified compound digital identity may be generated by comparing information obtained from the one or more online identity sources of the customer with information associated with the authenticated identity document.

For instance, the verified compound digital identity may be generated by verifying the name and residential address of the customer with electronic data from at least two separate sources, backed up by date-of-birth verification from one data source, and proof that the customer has a transaction history of at least three years from other sources. In this instance, the customer identity may be verified in accordance with government regulations directed towards anti-money laundering and counter-terrorism financing.

In some embodiments, the verified compound digital identity may be generated by using information obtained from the one or more online identity sources of the customer to validate the step of authentication of the identity document.

For instance, information obtained from the one or more online identity sources may be used to identify and match data stored under misspelt names or addresses, or where the customer has had a change of name or address.

Advantageously, generating a verified compound digital identity based on a combination of government-issued identity documents and online identity information representing the customer's business, professional and social identities (compound digital identity) provide a layered and holistic approach to identity verification and increases acceptance rates for legitimate customers and accuracy levels for fraud detection during onboarding. In addition, the verified compound digital identity improves interoperability and reusability and avoids the need to maintain different identity documents for different contexts.

In some embodiments, one or more pieces of additional information may be used to generate a verified compound digital identity for the customer. For instance, the additional information may include open banking data, credit report, rental history, characteristics, and account activity of the electronic device of the customer, pay slips, boarding passes, or other travel history, or the like. In use it is envisaged that the additional information may be used to establish a transaction history for the customer, may be used to confirm a change of name or address of a customer, may be used to establish a level of assurance or risk in the verified compound digital identity, or the like.

The verified compound digital identity may be generated by any suitable process.

In some embodiments, the verified compound digital identity may be generated without storing personally identifiable information, such as the biometric characteristic of the customer and/or the identity document of the customer. For instance, the personally identifiable information may be staged during the transaction and destroyed upon generation of the verified compound digital identity, the verified compound digital identity may be generated from dispersed personally identifiable information without copying or storing the information, the verified compound digital identity may be generated without including the personally identifiable information in the verified compound digital identity, or any suitable combination thereof.

As indicated, the method for identifying and verifying a customer comprises associating the verified compound digital identity of the customer with an electronic device of the customer.

The verified compound digital identity of the customer may be associated with an electronic device of the customer by any suitable means. Generally, the method of associating the verified compound digital identity of the customer with an electronic device of the customer may be sufficient to enable the verified compound digital identity to be re-used and to securely store the verified compound digital identity.

For instance, the verified compound digital identity may be associated with an electronic credential such as a digital certificate, token, public key cryptography, blockchain, or any suitable combination thereof.

In some embodiments, an electronic credential associated with the customer and/or the electronic device of the customer may be attached to the verified compound digital identity.

In some embodiments, the verified compound digital identity may be associated with a blockchain. The verified compound digital identity may be associated with two or more blockchains. A level of assurance may be associated with the verified compound digital identities each time the verified compound digital identity is successfully verified by a service provider.

The verified compound digital identity may be stored in a blockchain-based identity wallet.

In some embodiments, the verified compound digital identity may be associated with a QR code. The QR code may provide a link to a wallet comprising a verified compound digital identity. In this instance, it is envisaged that scanning the QR code may make a blockchain-based verified compound digital identity accessible by a service provider.

In some embodiments, the verified compound digital identity may be associated with a distributed ledger technology.

In some embodiments, the verified compound digital identity may be associated with trust score, wherein the trust score indicates a reputation of the verified compound digital identity.

In use, it is envisaged that the trust score may be used as a real-time measure of a reputation of an identity element that can be leveraged for identity verification. The identity elements may comprise identity attributes (such as name, address, date of birth, email address, or the like), biometric characteristics (such as facial matching, liveness, voice, or the like), and characteristics of the electronic device of the customer (such as phone number, phone tenure (SIM tenure, tenure of device), line attributes (active number, number porting, mobile status, available network status, and line type), account activity (change event occurrence velocity), device activity (device ownership tenure), or the like), the connectivity of the customer (such as network score and security, network risk, Internet Protocol risk, or the like), customer reputation (such as cyber check, death check, police checks, watch list, or the like), customer behaviour (such as on Social Media or the like).

In use, it is envisaged that a trust score calculated from multiple identity elements may be used to indicate a reputation of the verified compound digital identity.

In some embodiments, the trust score may be used to indicate a level of confidence or assurance in the verified compound digital identity. In this instance, it is envisaged that each time the verified compound digital identity is successfully verified by a service provider, the level of assurance for the verified compound digital identity may be incremented which may indicate the level of confidence in the verified compound digital identity.

In some embodiments, the trust score may be used to indicate a level of risk or a risk indicator of the verified compound digital identity. In this instance, it is envisaged that the level of risk may be amended each time the verified compound digital identity is successfully verified by a service provider, not verified or unverified by a service provider, when more secure (or conversely less secure) identity elements may be associated with the verified compound digital identity or depending on the behaviour or reputation of one or more of the online identity sources of the customer.

In use, it is envisaged that trusted relationships between the customer and the identity provider and the identity provider and multiple service providers may build a web of trust between the parties. For example, a service provider with an existing relationship with an identity provider may already have a given level of trust in a new customer who has a verified relationship with the identity provider.

It is envisaged that, in some circumstances, the step of authenticating the identity document associated with the customer may be unsuccessful. This may be for any number of reasons, such as, but not limited to, the customer's name, date of birth or nationality not matching the identity document provided, the identity document not being an accepted form of identification, the picture of the customer in the identity document being unclear, the identity document being expired, too old or damaged, the photograph submitted by the customer not matching the picture in the identity document, and so on. In these embodiments, it is envisaged that there may be a mismatch between the information in the identity document provided by the customer and the data held by the data holder associated with the customer.

If the step of authenticating the identity document associated with the customer is unsuccessful, an electronic notification may be generated. This electronic notification may be issued to a human associated with the electronic identity verification and management platform for investigation and/or rectification.

However, it will be understood that involving a human in the investigation and/or rectification of the unsuccessful authentication may be undesirable. Firstly, requiring human input may be time-consuming and prone to human error. Secondly, human involvement increases costs associated with the authentication process. Thirdly, involving a human has privacy implications when the human must verify what may be a customer's sensitive personal information.

In addition to the above, delays caused when requiring a human to investigate and/or rectify an unsuccessful authentication may reduce customer satisfaction with the method and the electronic identity verification and management platform.

Thus, in a preferred embodiment of the invention, the electronic identity verification and management platform may generate an electronic alert when the step of authenticating the identity document associated with the customer is unsuccessful. The electronic alert may be of any suitable form, although in a preferred embodiment of the invention, the electronic alert may comprise a text message, email message, push notification, pop-up box or the like, or any suitable combination thereof.

The electronic alert may be received by any suitable recipient. However, in a preferred embodiment of the invention, the electronic alert may be received by the customer. More specifically, the electronic alert may be received by an electronic device associated with the customer. The electronic device may be of any suitable form, and may comprise a computer, computing tablet, mobile telephone, smart watch or the like, or any suitable combination thereof. In a preferred embodiment of the invention, the electronic alert may be provided to the customer in the electronic identity verification and management platform.

In a preferred embodiment of the invention, the electronic alert may be generated substantially instantaneously. It will be understood that this is intended to mean that electronic alert is generated without delay, other than any electronic processing delays associated with authentication of the identity document. Thus, the electronic alert may be generated substantially in real-time so that the customer is aware that there is a problem with authenticating the identity document.

The electronic alert may contain any suitable information. Preferably, however, the electronic alert identifies the identity document for which authentication has been unsuccessful. The electronic alert may also contain information regarding how the customer can overcome the issue. This information may comprise, for instance, a series of steps (in text and/or graphical form). Alternatively, the electronic alert may comprise a link (such as a hyperlink) to the electronic identity verification and management platform and, more specifically, to a part of the electronic identity verification and management platform where the customer can review the unsuccessful authentication and/or upload one or more new identity documents.

The electronic identity verification and management platform may allow a customer to upload any suitable number of new identity documents. In a preferred embodiment of the invention, however, the customer may be prevented from uploading further documents once a predetermined number of unsuccessful authentication attempts have been made. Any suitable predetermined number of unsuccessful authentication attempts may be allowed before the customer is prevented from uploading further documents. In a preferred embodiment, however, the customer may be allowed three unsuccessful attempts (including the original unsuccessful attempt that resulted in the generation of the electronic alert) before further attempts are prevented. It is envisaged that a limit may be placed on the number of unsuccessful attempts to reduce or eliminate fraudulent activity within the electronic identity verification and management platform.

The one or more new identity documents may be of any suitable type, and it is envisaged that the one or more new identity documents may be of the same general type as described previously. The one or more new identity documents may be documents not previously submitted to the electronic identity verification and management platform. Alternatively, the customer may re-submit the identity document whose authentication was unsuccessful. This may be done when, for instance, the photo associated with the identity document was unclear and re-submitting the identity document may overcome the reason that the authentication was unsuccessful.

Once the customer has successfully completed the step of authenticating the one or more new identity documents, the remaining steps in the method may be performed in the manner previously described.

With the foregoing in view, the present invention in a second aspect, resides broadly in a method for electronic identity verification and management comprising:

receiving, via an electronic identity verification and management platform, a request for a verification of identity for a customer by a service provider;

requesting, via the electronic identity verification and management platform, consent from the customer to access data from one or more data holders associated with the customer;

receiving, via the electronic identity verification and management platform, consent from the customer to access data from the one or more data holders and sending the consent to the one or more data holders;

receiving, via the electronic identity verification and management platform, customer data from the one or more data holders;

processing the customer data to verify the identity of the customer;

identifying one or more online identity sources of the customer and analysing the one or more online identity sources to determine a level of risk associated with the customer identity, and generating a verified compound digital identity for the customer based on the authenticated identity document and the one or more online identity sources of the customer without storing personally identifiable information, Preferably, the electronic identity verification and management platform according to the second aspect of the invention may be the electronic identity verification and management platform according to the first aspect of the invention.

The electronic identity verification and management platform may comprise a computing device or devices, a server, a virtual server, a physical server, a cloud server, a computing cloud, a client terminal, a network node, a network server, a virtual machine, a personal electronic device, or the like.

The electronic identity verification and management platform may be delivered as a Software as a Service (SaaS), Application Programming Interface (API) or Hosted solution.

In some embodiments, the electronic identity verification and management platform may comprise a cloud server.

In use, it is envisaged that the cloud server may provide computing and storage functions for the electronic identity verification and management platform. For instance, the cloud server may temporarily stage customer data transferred from a data holder to the customer, may collect and process customer data using one or more APIs, may transfer customer consent and verified compound digital identity to a data holder, may log digital identity verification results, may log the forwarding of verified compound digital identity to further data holders, or any suitable combination thereof.

In use, it is envisaged that a user interface displayed on an electronic device or a web portal and the cloud server providing computing and storage functions for the electronic identity verification and management platform may be remote from one another.

In some embodiments, an identity provider may facilitate the verification of an identity of the customer for a service provider using the electronic identity verification and management platform. In other embodiments, the electronic identity verification and management may perform some of the processing steps autonomously.

As indicated, the method for electronic identity verification and management comprises receiving, via an electronic identity verification and management platform, a request for a verification of identity for a customer from a service provider.

The service provider may request a verification of identity for a customer for any suitable purpose. Generally, the service provider may request verification of identity in order to provide a service to the customer.

For example, the service provider may wish to verify the legal age of the customer making a transaction limited to those over the age of 18 years (such as the purchase of liquor, X-rated games, or the like), may wish to verify the identity and authenticity of documents for a customer seeking enrolment in a university, may be performing pre-employment checks, or the like. In this instance, it is envisaged that the service provider may provide a copy of the identity documents or other relevant information (such as a valid phone number) of the customer to the electronic identity verification and management platform when requesting verification of identity.

As indicated, the method for electronic identity verification and management comprises requesting, via the electronic identity verification and management platform, consent from the customer to access data from one or more data holders associated with the customer.

The request for consent from the customer to access customer data may be sent to the customer in any suitable manner. Generally, the request for consent may be delivered by a secure digital channel to an electronic identity verification and management platform accessible by the customer.

For example, the customer may be sent the request for consent through a user interface on an electronic device of the customer, an application downloaded onto an electronic device of the customer, through a secure website or web portal associated with the electronic identity verification and management platform (including mobile responsive designs), or the like.

In use, it is envisaged that the customer may be able to select and/or provide details of the one or more data holders and/or details of their account with the data holder when providing their consent. In some embodiments, the customer may be asked to provide a verified compound digital identity of the customer when providing their consent.

The customer may be asked to provide one or more further identity documents of the customer when providing their consent. One or more further identity documents may be requested if the digital identity of the customer cannot be verified based on the information initially provided when the verification of identity for the customer was requested by the service provider. For instance, one or more further identity documents may be requested if the reputation in the identity elements provided by the customer may not be sufficient to provide a level of confidence or assurance in the verified compound digital identity and/or indicate a level of risk of the digital identity to be verified.

The customer may be asked to consent to the access of customer data from one or more data holders.

Customer data may be accessed from any suitable data holder.

In some embodiments, the data holders may be open banking institutions such as banks and other financial institutions. In this instance, customer data may comprise open banking data such as personal information (such as customer name and address), payroll information (such as income and employment verification), account information (such as customer name, account type), transaction details (statements, deposits, payment) and repayment history, expense management), or the like.

Preferably, the customer data may be accessed from data holders who have pre-verified the customer against reliable data sources. For instance, the data sources may comprise open banking data, energy providers, telecommunication providers, or the like.

As indicated, the method for electronic identity verification and management comprises receiving, via the electronic identity verification and management platform, a consent from the customer to access data from the one or more data holders and sending the consent to the one or more data holders.

In some embodiments, the electronic identity verification and management platform sends the consent information to the cloud server, where it may be staged before sending to the one or more data holders. In this instance, it is envisaged that the data holder may provide the electronic identity verification and management platform with an authorisation code and/or token, to authorise and authenticate the sharing of data.

In other embodiments, the customer may provide consent for the service provider to access the data by providing the data holder with an authorisation code and/or token to authorise and authenticate the sharing of data.

In some embodiments, the customer may provide a valid phone number and consent for the service provider to access the data and in response, the service provider may provide the customer with a one-time password to authorise and authenticate the sharing of data, or to allow the customer to provide an identity document directly.

The consent information received from the customer may be sent to the one or more data holders in any suitable manner. Generally, the consent information may be delivered by a secure digital channel to the electronic identity verification and management platform.

As indicated, the method for electronic identity verification and management comprises receiving, via the electronic identity verification and management platform, customer data from the one or more data holders.

In some embodiments, upon receiving the authorisation code and/or the token from the service provider, the data holder may provide the cloud server associated with the electronic identity verification and management platform with the customer data using a secure digital channel (such as HTTP Web or API) and/or may provide the cloud server with a token so that the electronic identity verification and management platform can access the customer data using a secure digital channel without accessing direct account information and having the need to download that information.

Any suitable customer data may be obtained from the data holder. For instance, the customer data may include personal information, payroll information, account information and transaction details. Preferably, the customer data may be staged for the duration of the transaction. Preferably, the customer data obtained from the data holder may comprise pre-verified identity information, wherein the data holder has verified and authenticated the identity of the customer.

As indicated, the method for electronic identity verification and management comprises processing the customer data to verify the identity of the customer.

The customer data may be processed in any suitable manner.

It is envisaged that, in some circumstances, the step of processing the customer data to verify the identity of the customer may be unsuccessful.

In these embodiments, the electronic identity verification and management platform may generate an electronic alert when the step of processing the customer data to verify the identity of the customer is unsuccessful. The electronic alert is processed in an identical manner as according to the first aspect of the invention.

For instance, an identity document provided to the service provider by the customer may be authenticated by comparing the identity document with the customer data obtained from the data holder. For instance, the customer data obtained from the data holder may be used to verify the identity has been active in the community (for example through the purchase history of the customer) thereby proofing the identity. For instance, the customer data obtained from the data holder may be used to verify the digital identity of a customer and to generate a verified compound digital identity.

For instance, the customer data provided to the service provider by the customer may include account information of the customer, such as the bank details, account number and customer name, wherein the account information may be used to verify the identity of the customer.

As indicated, the method for electronic identity verification and management comprises identifying one or more online identity sources of the customer and analysing the one or more online identity sources to determine a level of risk associated with the customer identity.

In embodiments of the invention in which the step of processing the customer data to verify the identity of the customer is unsuccessful (resulting in the uploading of one or more new identity documents) the level of risk associated with the customer identity may be determined based on the reason for the unsuccessful authentication of the identity document and/or the nature of the one or more new identity documents upload by the customer.

For instance, if the reason for the unsuccessful authentication of the identity document was because, for instance, a photograph was unclear, or a document was expired or too old, the level of risk may be lower than if the reason for the unsuccessful authentication of the identity document was because, for instance the name and/or photograph on the identity document did not match the records of a data holder associated with the identity document.

The online identity source may comprise a business identity (such as an individual, a company owner, business name, or the like), a professional identity (such as job title, or the like), a social identity (such as Facebook, LinkedIn, Twitter, SnapChat, or the like), or the like. In other embodiments, the online identity source may comprise an identity on the dark web, a global watch list, or the like.

As indicated, the method for electronic identity verification and management comprises generating a verified compound digital identity for the customer based on the authenticated identity document and the one or more online identity sources of the customer without storing personally identifiable information.

The verified compound digital identity may be generated by comparing information obtained from the one or more online identity sources of the customer with information associated with the authenticated identity document.

The verified compound digital identity may be generated by using information obtained from the one or more online identity sources of the customer to validate the step of authentication of the identity document.

One or more pieces of additional information may be used to generate a verified compound digital identity for the customer. For instance, the additional information may include open banking data, credit report, rental history, characteristics, and account activity of the electronic device of the customer, pay slips, boarding passes, or other travel history, or the like. In use it is envisaged that the additional information may be used to establish a transaction history for the customer, may be used to confirm a change of name or address of a customer, may be used to establish a level of assurance or risk in the verified compound digital identity, or the like.

The verified compound digital identity may be generated by any suitable process.

In some embodiments, the verified compound digital identity may be generated without storing personally identifiable information, such as the biometric characteristic of the customer and/or the identity document of the customer. For instance, the personally identifiable information may be staged during the transaction and destroyed upon generation of the verified compound digital identity, the verified compound digital identity may be generated from dispersed personally identifiable information without copying or storing the information, the verified compound digital identity may be generated without including the personally identifiable information in the verified compound digital identity, or any suitable combination thereof.

In some embodiments, a verified compound digital identity may be generated by the electronic identity verification and management platform and provided to the customer.

Preferably, the service provider minimises the customer data collected and destroys the customer data collected in accordance with relevant privacy acts. Customer data may be destroyed by de-identifying the data such that the information is no longer considered personal information and there is no reasonable likelihood of re-identification occurring.

In some embodiments, the electronic identity verification and management platform may stage the customer data on the cloud server for the duration of the transaction and subsequently de-identify the customer data after the transaction is complete. Preferably, the details of the transaction may be de-identified after the transaction is completed by removing personally identifiable information.

Any detail of the transaction may be de-identified. For instance, the verified compound digital identity, the transaction logs, raw customer data, derived customer data, or the like may be de-identified. In this instance, it will be understood that de-identifying details of the transaction removes personally identifiable information from the verified compound digital identity, the transaction logs, raw customer data, derived customer data, or the like.

Preferably, the verified compound digital identity of the customer may be generated without storing personally identifiable information, such as the biometric characteristic of the customer and/or the identity document of the customer.

For instance, the personally identifiable information may be staged during the transaction and destroyed upon generation of the verified compound digital identity, the verified compound digital identity may be generated from dispersed personally identifiable information without copying or storing the information, the verified compound digital identity may be generated without including the personally identifiable information in the verified compound digital identity, or any suitable combination thereof.

In some embodiments, customers may monitor and manage consent provided to a service provider using the electronic identity verification and management platform.

For instance, the electronic identity verification and management platform may store in one or more dashboards, details of consent provided to a service provider to collect and use customer data, a summary of customer data accessed by the service provider, the details of processing performed on the customer data and the details of results generated from processing the customer data. Advantageously, consent management provides improved transparency and improved customer control of customer data.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
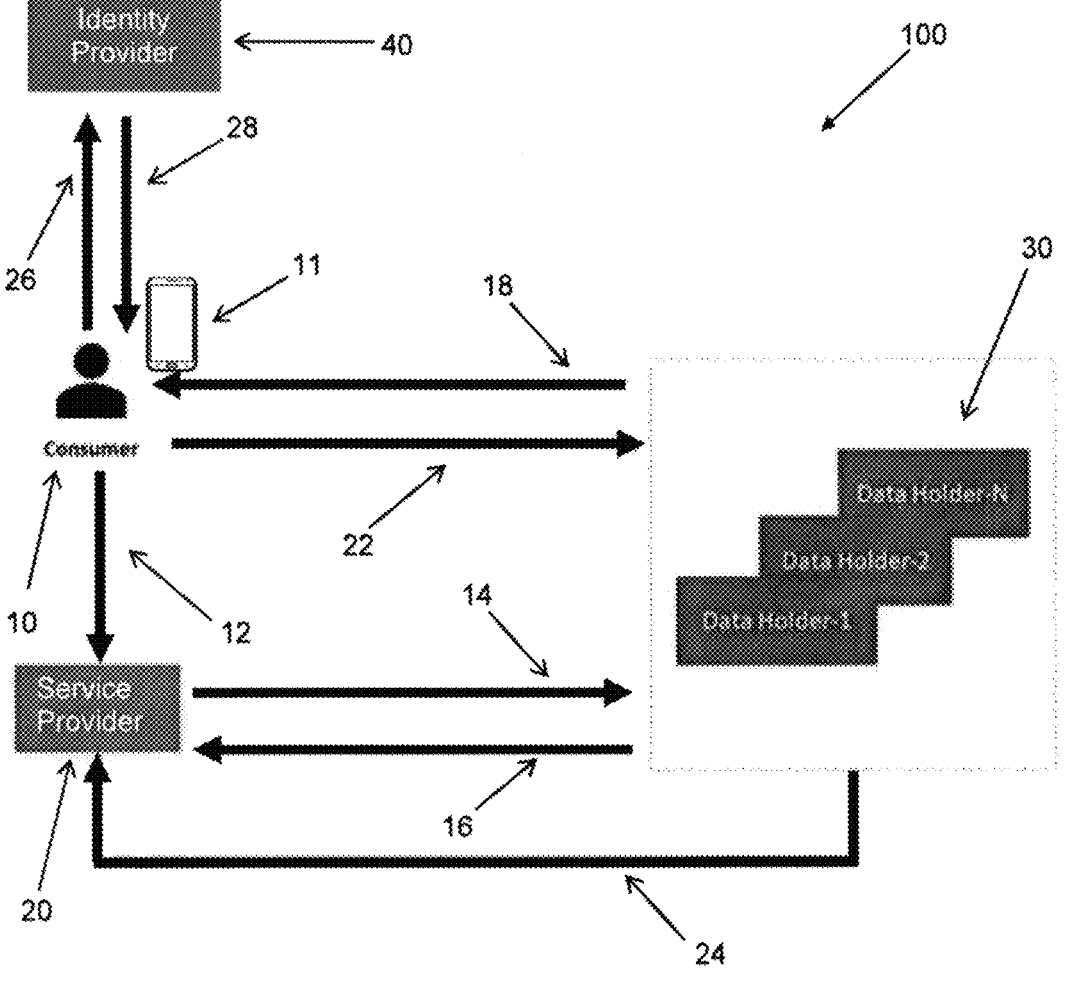
FIG. 1 illustrates a method for electronic identity verification and management according to an embodiment of the invention.

In FIG. 1, a method for electronic identity verification and management 100 is illustrated. Customer 10 provides consent to access customer data 12 from one or more data holders 30 to service provider 20 via an electronic identity verification and management platform 11 associated with an electronic device of the customer. Customer 10 may provide an authorisation code and/or token (not shown) obtained from the data holder which can be used to authorise and authenticate the sharing of data.

Service provider 20 sends a request for access to the customer data 14 to data holder 30. Data holder 30 receives the request and authenticates the accredited data recipient status 16 of service provider 20.

Data holder 30 authenticates the request to access data 18 by sending a request for consent to the customer and additionally, requests the customer verify their identity. Customer 10 receives the request for consent and verification of identity 18 on the electronic identity verification and management platform 11.

Customer 10 uses an electronic device, such as a personal mobile phone, to continuously capture a facial image of the customer together with their identity document and electronically sends the captured biometric characteristic to the electronic identity verification and management platform 11 and requests verification of the customer identity 26 from an identity provider 40.

The identity provider 40 utilises facial recognition technology to verify the captured biometric characteristic matches the customer's image on the identity document and authenticates the identity document by checking the identity document against the document issuing authority and other local and global data sources.

The identity provider 40 issues customer 10 with a verified digital identity 28 which is associated with the electronic device 11 of the customer. Advantageously, the identity provider 40 verifies the customer identity and issues the customer 10 a verified digital identity without storing the personally identifiable information of the customer.

Customer 10 sends their verified digital identity and gives consent 22 to the data holder 30 via the electronic identity verification and management platform 11, authorising the data holder to share data with the service provider. Data holder 30 shares customer data 24 in the form of open banking data with the service provider 20.

Preferably, the identity provider 40 issues the customer 10 with a verified compound digital identity, wherein the service provider identifies one or more online identity sources of the customer and analyses the online identity sources to determine a level of risk associated with the identity of the customer. Preferably, the identity provider generates a verified compound digital identity for the customer based on the authenticated identity document and the one or more online identity sources without storing personally identifiable information In FIG. 2, a method for electronic identity verification and management 200 is illustrated. Service provider 120 initiates identity verification (Step 0) of a customer 110 through the electronic identity verification and management platform 111.

The electronic identity verification and management platform 111 (or an identity provider supporting the electronic identity verification and management platform) requests the consent (Step 1) of the customer 110 to access data from a data holder 130 associated with the customer. In this instance, the data may be open banking data and the data holder may be a banking or other financial institution. Preferably, consent to access open banking data from one or more banking or other financial institution may be requested (Step 10).

After consent from the customer is received, the electronic identity verification and management platform 111 sends the consent information (Step 2) to the cloud server 112 associated with the electronic identity verification and management platform, where it is staged before sending (Step 3) to one or more data holders 130. The electronic identity verification and management platform 111 receives a Request URI (Step 3) from the one or more data holders 130.

Customer 110 using an electronic identity verification and management platform 111 logs onto a portal associated with data holder 130 such as an online banking account, using multifactor authentication and the Request URI (Step 4) provided by the data holder 130.

Customer 110 logs onto the portal associated with the data holder 130 and gives consent (Step 5) for the electronic identity verification and management platform 111 to access their open banking data. After receiving customer consent, the data holder 130 provides the electronic identity verification and management platform 111 with an authorisation code and ID token (Step 6) which can be used to authorise and authenticate the sharing of customer data.

The electronic identity verification and management system 111 transfers the authorisation code and/or token securely (Step 7) to the cloud server 112 where it is staged before sending (Step 8) to the data holder 130. In return, data holder 130 exchanges the authorisation code and ID token for an Access token (Step 8).

The cloud server associated with the electronic identity verification and management system 111 uses a secure API channel and the Access token to receive customer data (Step 9) such as personal information, payroll information, account information and transaction details from the data holder 130.

The cloud server 112 processes the customer data obtained from the data holder 130 to verify the identity of the customer and generates a result to the request for verification of identity (Step 11). The result is sent to the service provider (Step 13).

Figure 2:
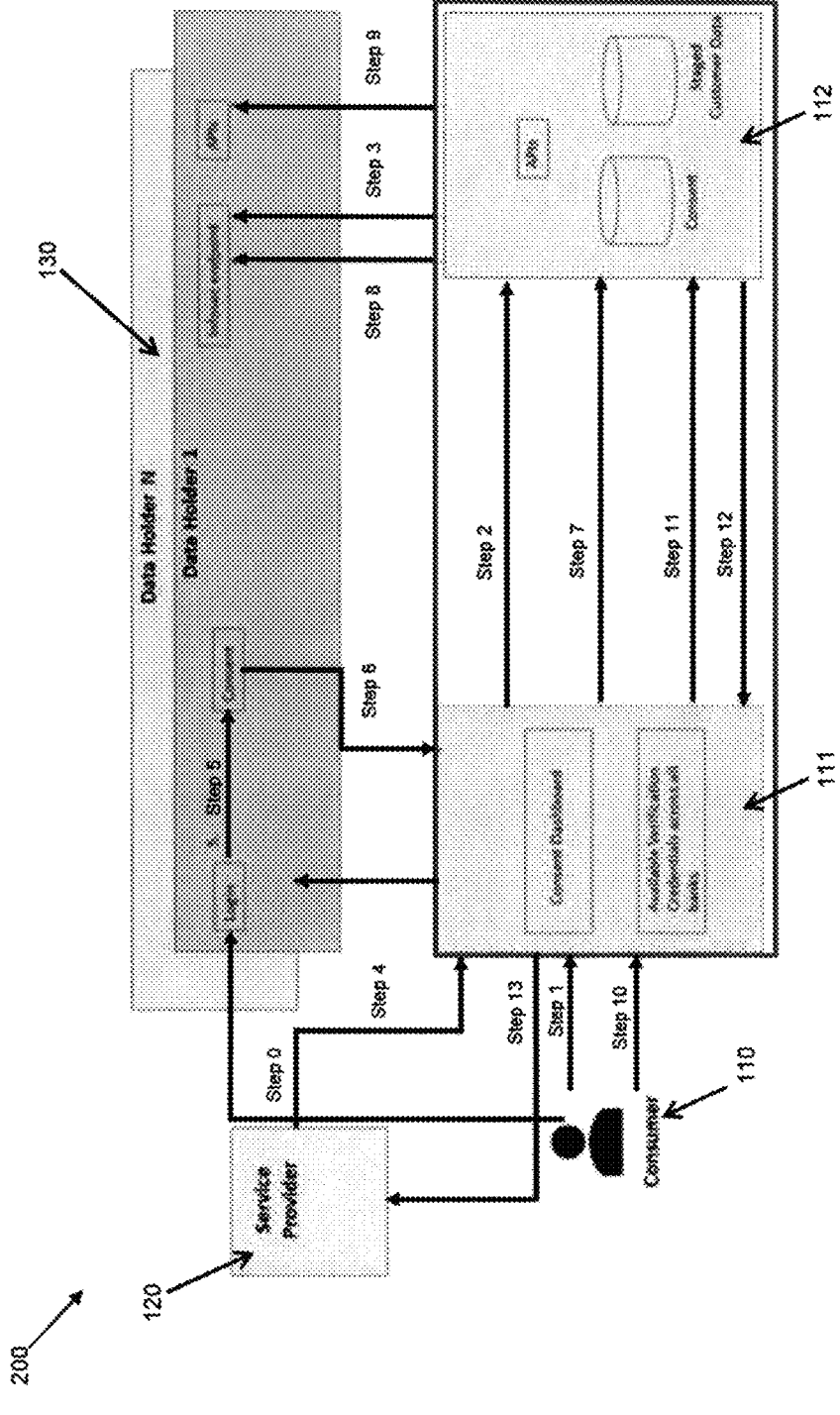
FIG. 2 illustrates a method for electronic identity verification and management according to an embodiment of the invention.

Advantageously, using the consent process illustrated in FIG. 2 allows the service provider to access the customer data directly from the customer account minimising the amount of data collected. In addition, using the Request URI, authorisation codes and tokens reduces the amount of personally identifiable information shared with and stored by the service provider and/or data holder. Advantageously, associating verified digital identities with an electronic device of the customer enables the customer to re-use the verified digital identity with multiple data holders. In addition, it is envisaged that personally identifiable information is not stored and/or is removed from customer data (de-identified) during the transaction.

Figure 3:
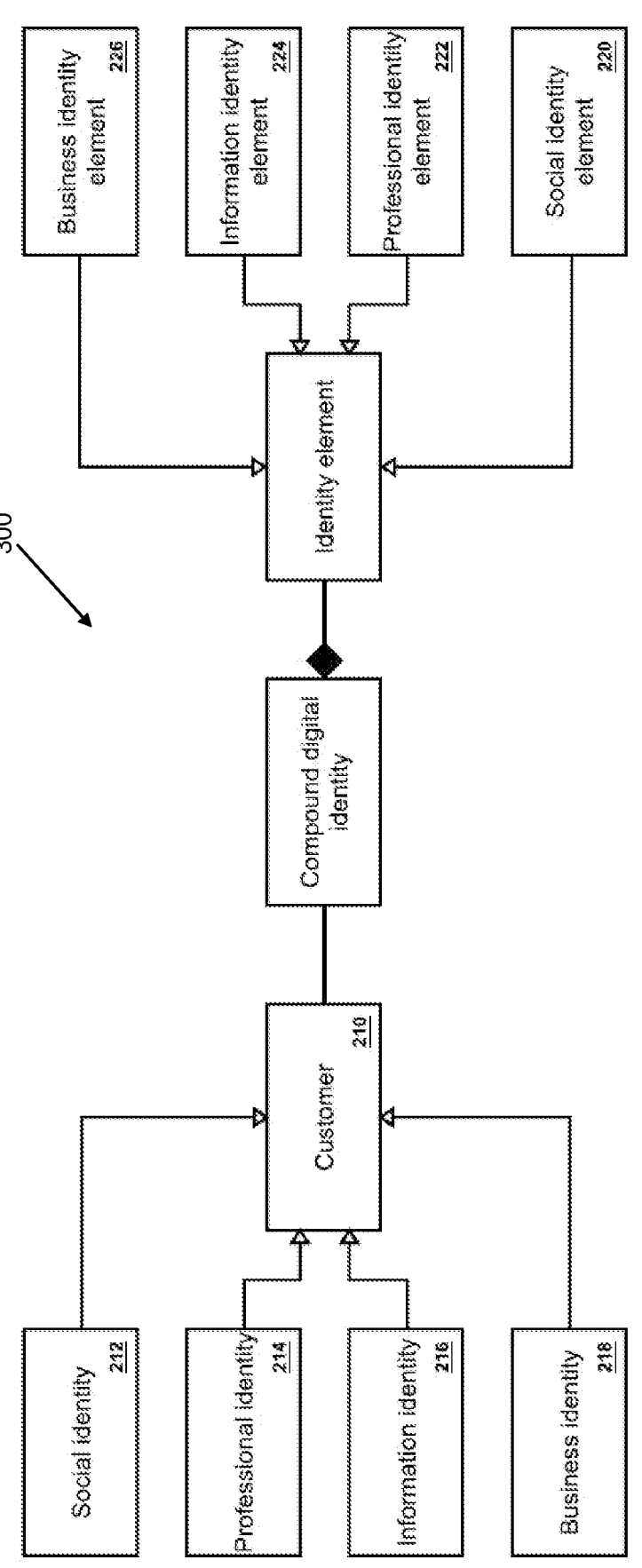
FIG. 3 illustrates a schematic of a compound digital identity of a customer according to an embodiment of the invention.

In FIG. 3, a schematic 300 illustrating a compound digital identity 230 according to an embodiment of the invention is illustrated.

Compound digital identity 300 comprises information from multiple identity sources including government-issued identity documents as well as professional, business, information and social identities of the customer.

Customer 210 may have one or more identity sources, such as a social identity 212, a professional identity 214, an information identity 216 and a business identity 218, preferably the one or more identity sources are online identity sources. Customer 210 also has a digital identity composed of one or more identity elements obtained from a business identity element 226, information identity element 224, professional identity element 222 and social identity element 220 of customer 210.

Advantageously, generating a verified compound digital identity based on a combination of government-issued identity documents and online identity information representing the customer's business, professional and social identities (compound digital identity) provide a layered and holistic approach to identity verification and increases acceptance rates for legitimate customers and accuracy levels for fraud detection during onboarding.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

Figure 4:
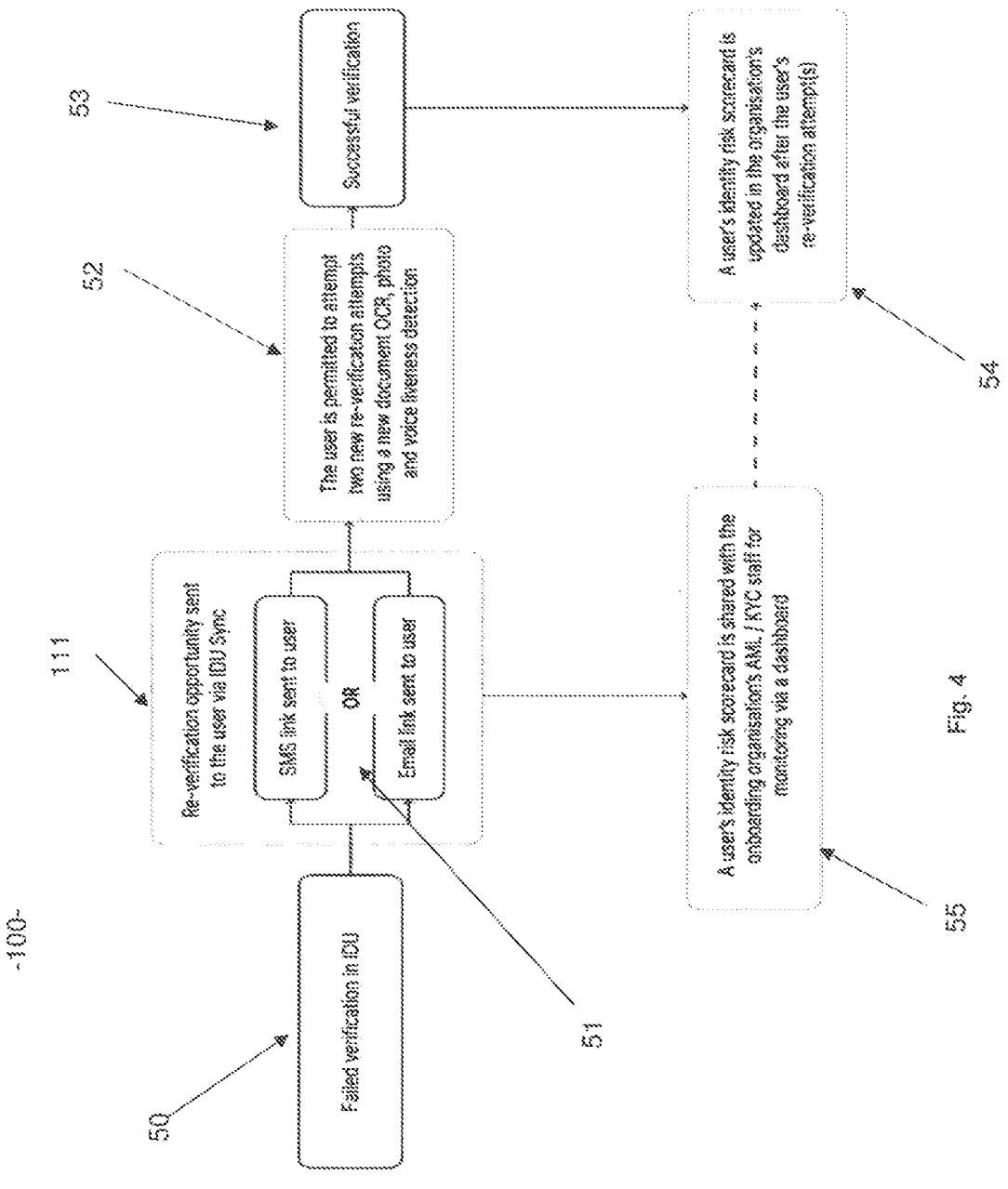
FIG. 4 illustrates a schematic of a portion of a method for electronic identity verification and management according to an embodiment of the invention.

FIG. 4 illustrates a schematic of a portion of a method for electronic identity verification and management 100 according to an embodiment of the invention.

In this Figure, the step of authenticating the customer's identity document (as described in relation to FIG. 1) has been unsuccessful 50. The electronic identity verification and management system 111 generates an electronic alert 51 substantially instantaneously and issues the electronic alert 51 to the customer by either SMS or email. The electronic alert 51 contains a link (such as a hyperlink) to the electronic identity verification and management system 111 to allow the customer to upload 52 one or more new identity documents. Thus, the customer is able to upload new documents following an unsuccessful authentication 50 substantially immediately, thereby increasing the speed with which the customer's identification may be successfully verified, and reducing human intervention in manual processing of unsuccessful authentications 50.

As previously mentioned, the customer is able to upload 52 one or more new identity documents in the same manner as previously described. However, a limit is placed on the number of attempts to upload 52 new identity documents. In the embodiment of the invention illustrated in FIG. 4, the customer is allowed two new authentication attempts following the unsuccessful authentication 50 in order to reduce or eliminate fraudulent activity associated with the electronic identity verification and management system 111.

In FIG. 5, a new identity document uploaded 52 to the electronic identity verification and management system 111 is successfully authenticated 53.

Once the customer's identity has been authenticated 53, a risk scorecard 54 may be generated or updated based on the failed authentication attempt 50 and the new identity document uploaded 52 to the electronic identity verification and management system 111. The risk scorecard 54 is also monitored 55 via a dashboard.

The electronic identity verification and management system 111 may determine the customer's risk scorecard based on the one or more new identity documents uploaded 52 to the electronic identity verification and management system 111 and/or based on the reasons for the unsuccessful authentication 50. For instance, the electronic identity verification and management system 111 may assign a higher risk to a customer whose name and/or image did not match that provided in the identity document compared to a customer who provided an identity document with an unclear photo.

The invention claimed is:

1. A method for identifying and verifying a customer, the method comprising:

receiving a request for a verification of identity for the customer;

capturing, using an electronic device associated with an electronic identity verification and management platform, a biometric characteristic of the customer and comparing the biometric characteristic with an identity document associated with the customer to verify a presence of the customer;

authenticating the identity document associated with the customer from a document issuing authority, wherein upon authentication of the identity document, the document issuing authority provides a verified digital identity to an electronic device of the customer;

identifying using the electronic identity verification and management platform, one or more online identity sources of the customer, receiving, from the one or more online identity sources, a Request-URI and sending, using the electronic identity verification and management platform, consent information from the customer to the one or more online identity sources, the consent information including an authorisation code and ID token;

receiving, with the electronic identity verification and management platform, an Access token from the one or more online identity sources, receiving and analysing, using the electronic identity verification and management platform, customer data from the one or more online identity sources to determine a level of risk associated with the identity of the customer, the level of risk being determined by identifying identity elements receiving from the one or more online identity source;

generating a verified compound digital identity for the customer based on the authenticated identity document, the customer data received from the one or more online identity sources and the level of risk associated with the identity of the customer, wherein the Request-URI, authorisation code and ID token are configured to de-identify personally identifiable information from the customer data such that the verified compound digital identity is generated, without storing the personally identifiable information, and associating the verified compound digital identity of the customer with an electronic device of the customer and associating a QR code with the verified compound digital identity.

2. The method for identifying and verifying the customer according to claim 1, wherein the biometric characteristic of the customer and an image of the identity document associated with the customer is captured substantially simultaneously.

3. The method for identifying and verifying the customer according to claim 2, wherein the biometric characteristic of the customer is a facial image of the customer and wherein the facial image of the customer and the image of the identity document associated with the customer is captured using high-definition video.

4. The method for identifying and verifying the customer according to claim 1, wherein the presence of the customer is verified in real-time.

5. The method for identifying and verifying the customer according to claim 1, wherein the biometric characteristic of the customer is compared to data read from an electronic chip on the identity document.

6. The method for identifying and verifying the customer according to claim 5, wherein the data is read from the electronic chip through Near Field Communication.

7. The method for identifying and verifying the customer according to claim 1, wherein the presence of the customer is verified using one or more of liveness detection, facial recognition technology, fingerprint, iris detection and voice authentication.

8. The method for identifying and verifying the customer according to claim 1, further comprising the step of:

associating the verified compound digital identity with a trust score, wherein the trust score is used to indicate a reputation of the verified compound digital identity.

9. The method for identifying and verifying the customer according to claim 1, wherein the one or more online identity sources comprise one or more of a business identity, an information identity, a professional identity and/or a social identity and wherein information obtained from the one or more online identity sources is used to indicate the level of risk associated with the identity of the customer.

10. The method for identifying and verifying the customer according to claim 1, wherein authenticating the identity document associated with the customer comprises checking the identity document against a data source from an interstate or international jurisdiction.

11. The method for identifying and verifying the customer according to claim 1, wherein associating the verified compound digital identity of the customer with the electronic device of the customer enables the verified compound digital identity to be re-used.

12. The method for electronic identity verification and management according to claim 1, wherein the customer data is open banking data.

13. The method for electronic identity verification and management according to claim 1, wherein processing the customer data comprises verifying account information of the customer.

14. The method for electronic identity verification and management according to claim 1, wherein the customer data comprises a data source from an interstate or international jurisdiction.

15. The method according to claim 1, wherein, if the step of authenticating the identity document associated with the customer is unsuccessful, the electronic identity verification and management platform generates an electronic alert, wherein the electronic alert is optionally sent to the customer.

16. The method according to claim 15, wherein the electronic alert includes a link to the electronic identity verification and management platform to allow the customer to upload one or more new identity documents, the one or more new identify documents being used for verifying the identity of the customer.

17. The method according to claim 15, wherein the electronic alert is generated substantially instantaneously when the step of authenticating the identity document associated with the customer is unsuccessful.

18. The method according to claim 1, wherein, if the step of analysing the customer data to verify the identity of the customer is unsuccessful, the electronic identity verification and management platform generates an electronic alert, wherein the electronic alert is optionally sent to the customer.

19. The method according to claim 18, wherein the electronic alert includes a link to the electronic identity verification and management platform to allow the customer to upload one or more new identity documents, the one or more new identify documents being used for verifying the identity of the customer.

20. The method according to claim 1 further comprising the step of permitting one or more service providers to access the verified compound digital identity of the customer by scanning the QR code to determine the level of risk associated with providing services to the customer.

* * * * *